(12) United States Patent
Güntherberg et al.

(10) Patent No.: US 6,323,279 B1
(45) Date of Patent: Nov. 27, 2001

(54) LOW INDIVIDUAL COLOR THERMOPLASTIC MOLDING MATERIAL

(75) Inventors: Norbert Güntherberg, Speyer; Jürgen Koch, Neuhofen; Peter Ittemann, Lampertheim; Joachim Seibring, Freinsheim; Sven Grabowski, Ludwigshafen; Graham Edmund McKee, Neustadt; Norbert Mosbach, Maxdorf; Bernhard Czauderna, Hirschberg; Norbert Niessner, Friedelsheim; Hartmut Heinen, Mannheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/446,982

(22) PCT Filed: Jun. 23, 1998

(86) PCT No.: PCT/EP98/03836

§ 371 Date: Dec. 30, 1999

§ 102(e) Date: Dec. 30, 1999

(87) PCT Pub. No.: WO99/01489

PCT Pub. Date: Jan. 14, 1999

(30) Foreign Application Priority Data

Jul. 4, 1997 (DE) ............................................. 197 28 629

(51) Int. Cl.⁷ ................................................... C08G 63/48
(52) U.S. Cl. ............................................................. 525/70
(58) Field of Search ................................................ 525/70

(56) References Cited

U.S. PATENT DOCUMENTS

| 4,419,492 | 12/1983 | Simon | 525/71 |
| 5,028,349 | 7/1991 | Eichenauer et al. | 525/71 |
| 5,674,940 | 10/1997 | Eichenauer et al. | 525/71 |
| 5,741,853 | 4/1998 | Eichenauer et al. | 525/71 |
| 5,817,266 | 10/1998 | Guentherberg | 264/211.23 |

FOREIGN PATENT DOCUMENTS

| 71 615 | 5/1970 | (DE) . |
| 24 27 960 | 6/1975 | (DE) . |
| 25 03 966 | 8/1975 | (DE) . |
| 35 05 749 | 8/1986 | (DE) . |
| 6 341 | 1/1980 | (EP) . |
| 665 095 | 8/1995 | (EP) . |
| 678 531 | 10/1995 | (EP) . |
| 712 895 | 5/1996 | (EP) . |
| 745 624 | 12/1996 | (EP) . |
| 95/22570 | 8/1995 | (WO) . |

Primary Examiner—Terressa M. Boykin
(74) Attorney, Agent, or Firm—Keil & Weinkauf

(57) ABSTRACT

A thermoplastic molding composition having little intrinsic color is produced from a graft copolymer and a thermoplastic polymer. The graft copolymer is produced from a soft elastomeric particulate graft base obtained by polymerization of a conjugated diene alone or with a small amount of a monoethylenically unsaturated monomer, upon which is grafted a vinylaromatic monomer and acrylonitrile and optionally another monoethylenically unsaturated monomer. The thermoplastic polymer is a copolymer of a vinylaromatic monomer and acrylonitrile and optionally an additional monoethylenically unsaturated monomer. The thermoplastic molding composition has a low level of intrinsic color coupled with good mechanical properties and can be processed by, for example, extrusion, injection molding, calendaring, blow molding, compression molding, or sintering.

19 Claims, No Drawings

LOW INDIVIDUAL COLOR THERMOPLASTIC MOLDING MATERIAL

The present invention relates to thermoplastic molding compositions comprising, as components A) to F), based on the total weight of the molding composition, A) from 5 to 80% by weight of a graft polymer A) having bimodal particle size distribution made from, based on A),
   a1) from 40 to 90% by weight of an elastomeric particulate graft base a1), obtainable by polymerization of, based on a1),
      a11) from 70 to 100% by weight of at least one conjugated diene,
      a12) from 0 to 30% by weight of at least one other monoethylenically unsaturated monomer and
   a2) from 10 to 60% by weight of a graft a2) made from, based on a2),
      a21) from 65 to 95% by weight of at least one vinylaromatic monomer,
      a22) from 5 to 35% by weight of acrylonitrile, and
      a23) from 0 to 30% by weight of at least one other monoethylenically unsaturated monomer,
B) from 20 to 95% by weight of a thermoplastic polymer B) having a viscosity number VN (determined according to DIN 53726 at 25° C., 0.5% strength by weight in dimethylformamide) of from 50 to 120 ml/g, made from, based on B),
   b1) from 69 to 81% by weight of at least one vinylaromatic monomer,
   b2) from 19 to 31% by weight of acrylonitrile, and
   b3) from 0 to 30% by weight of at least one other monoethylenically unsaturated monomer and
C) from 0 to 50% by weight of a thermoplastic polymer C) having a viscosity number VN of from 50 to 120 ml/g made from, based on C),
   c1) from 69 to 81% by weight of at least one vinylaromatic monomer,
   c2) from 19 to 31% by weight of acrylonitrile and
   c3) from 0 to 30% by weight of at least one other monoethylenically unsaturated monomer,
where components B) and C) differ in their viscosity numbers VN by at least 5 units [ml/g], or in their acrylonitrile content by at least 5 units [% by weight], or in both characteristics, viscosity number VN and acrylonitrile content, by at least 5 units and
D) from 0 to 95% by weight of a thermoplastic polymer D) made from, based on D),
   d1) from 63 to less than 69% by weight of at least one vinylaromatic monomer,
   d2) from greater than 31 to 37% by weight of acrylonitrile,
   d3) from 0 to 40% by weight of at least one other monoethylenically unsaturated monomer and
E) from 0 to 50% by weight of a thermoplastic polymer E) made from, based on E),
   e1) from 4 to 96% by weight of at least one vinylaromatic monomer,
   e2) from 4 to 96% by weight of at least one monomer selected from the class consisting of methyl methacrylate, maleic anhydride and maleimides and
   e3) from 0 to 50% by weight of acrylonitrile,
where the polymer E) is different from the polymers B) and from C) and D) if they are present and
F) from 0 to 50% by weight of additives F), obtainable by
   1) preparing the graft polymers A) by emulsion polymerization,
   2) mixing the graft polymer A) with the polymer B) and the other components C), D), E) and/or F) if they are present, in a mixing apparatus, giving an essentially molten polymer mixture, and
   3) rapid cooling of the essentially molten polymer mixture.

The invention further relates to a process for preparing the thermoplastic molding compositions, the use of the thermoplastic molding compositions for producing moldings, and finally the moldings produced from the thermoplastic molding compositions.

Moldings made from ABS (polybutadiene rubber particles grafted with polystrene-acrylonitrile in a matrix of polystyrene-acrylonitrile) have good mechanical properties, for example high strength and toughness and especially, due to the low glass transition temperature Tg of the polybutadiene, good impact strength, even at low temperatures.

ABS polymers, however, especially those prepared by emulsion polymerization, often have an intrinsic color, for example yellowish to brownish. This intrinsic color can, for example, be expressed using the Yellowness Index (YI), which for ABS polymers of this type having marked intrinsic color is from above 30 to well above 50. The Yellowness Index YI here depends on a number of factors, including the rubber content of the ABS. In addition, yellowish/brownish discolorations, for example, can frequently occur during preparation of the molding compositions and their further processing to give moldings, and during use of the moldings. The yellowing or brown coloration is favored by high temperatures, as encountered, for example, during injection molding or during blending with additives in an extruder; the stronger the intrinsic color of the unprocessed ABS pellets for injection molding or extrusion, the more marked the yellowing or brown coloration. In particular, there are problems in the coloration of polymers which are subject to yellowing, since the yellow tinge distorts the desired shade (unsatisfactory color fidelity) or requires the use of large amounts of expensive colorants (increased pigmentation costs). A meagre depth of color is, furthermore, often observed in pigmented ABS molding compositions, and results from their high level of light scattering. Since the initial level of intrinsic color and the depth of color of pigmented molding are responsible for the perceived color of the molding, the intrinsic color and the yellowing greatly reduce the usefulness of the molding compositions.

EP-A 6341 proposes processing an acrylonitrile rubber in an extruder flushed with inert gases, such as $N_2$ or $CO_2$, the yellow tinge of the polymer being thereby reduced. The operation of an extruder under inert conditions is disadvantageous, since it makes the process complicated and costly.

DE-B-2503966 proposes ABS molding compositions whose stability of color is improved by the additional use of a $C_1$–$C_8$-alcohol during the emulsion polymerization of the butadiene. The extent of reduction of the yellow tinge, however, is not always satisfactory. In addition, the alcohol can have a disadvantageous effect on certain properties of the molding compositions.

DE-B-2427960 discloses ABS molding compositions some of whose rubber particles have been agglomerated by adding an agglomerating dispersion to the finely divided polybutadiene latex, and which therefore have a broad or bimodal particle size distribution.

DE-A-3505749 proposes that a polybutadiene rubber grafted with styrene and acrylonitrile is precipitated from its latex by adding a sulfur-containing graft product based on polybutadiene, improving the thermal stability of the polybutadiene rubber when it has been precipitated and converted into molding compositions. The high contents of sulfur compounds, however, often give the molding compositions an unpleasant odor.

EP-A-678531 describes ABS molding compositions with a polybutadiene graft rubber having bimodal particle size distribution, where styrene and acrylonitrile, the monomers grafted onto the polybutadiene particles, are metered in predominantly during the first half of the monomer feed time. Although ABS compositions of this type have high toughness and are easy to process, they have a marked yellow tinge.

WO 95/22570 discloses a process for preparing an ABS polymer in which a finely divided rubber latex is prepared in emulsion, partially agglomerated, and the now bimodal latex is grafted in emulsion with SAN. The graft polymer is then separated from the aqueous phase and mixed, in melted form, with an SAN matrix polymer, the AN content of the SAN graft shell and of the SAN matrix differing by not more than 6% by weight. During the removal of water and/or the mixing in melt form of graft polymers and SAN matrix, a further, partial agglomeration of the graft particles takes place. Molding compositions of this type also have a disadvantageous yellowish intrinsic color.

It is an object of the present invention to remedy the disadvantages described, and in particular to provide molding compositions which have little intrinsic color, ie. a low initial level of the yellow tinge, and added to this a low yellowing tendency. In particular, the molding compositions should show hardly any yellowing even after prolonged heat aging or as a result of hot processing (eg. during injection molding or blending in an extruder).

An additional object is to provide molding compositions which have good pigmentability and which, after pigmentation, exhibit a very small discrepancy between the desired shade and the actual shade, and which require small amounts of colorants for their pigmentation. The pigmented molding compositions should have good depth of color, and for this reason the unpigmented molding composition should have very low light scattering.

The low level of intrinsic color desirable for the object of the invention can be defined by a Yellowness Index YI of $\leq 25$ and/or absorption of <0.1%. The depth of color, ie. low level of light scattering, desirable for the object of the invention can be defined by scattering values <4.9. The numerical values given are naturally based on the unpigmented molding composition and are determined as described in the examples.

A further object is to provide molding compositions whose low level of intrinsic color is not achieved with adverse effect on their other advantageous properties, for example mechanical properties, such as toughness and stiffness, or on their surface gloss level.

We have found that this object is achieved by means of the thermoplastic molding compositions defined at the outset. The invention also provides a process for preparing the thermoplastic molding compositions, the use of the thermoplastic molding compositions for producing moldings, and finally the moldings produced from the thermoplastic molding compositions.

Component A) is a graft copolymer having bimodal particle size distribution and is present in the novel molding compositions in a proportion of from 5 to 80% by weight, preferably from 10 to 70% by weight, particularly preferably from 15 to 60% by weight, based on the total of components A) and B) and, if present, C), D), E) and F). The graft polymer A) is built up from a "soft" elastomeric, particulate graft base a1) and a "hard" graft a2).

The graft base a1) is present in a proportion of from 40 to 90% by weight, preferably from 45 to 85% by weight, and particularly preferably from 50 to 80% by weight, based on component A).

The graft base a1) is obtained by polymerizing, based on a1), a11) from 70 to 100% by weight, preferably from 75 to 100% by weight, and particularly preferably from 80 to 100% by weight, of at least one conjugated diene, and a12) from 0 to 30% by weight, preferably from 0 to 25% by weight, and particularly preferably from 0 to 20% by weight, of at least one other monoethylenically unsaturated monomer.

Examples of conjugated dienes a11) are butadiene, isoprene, chloroprene and mixtures of these. Preference is given to the use of butadiene or isoprene or mixtures of these, and butadiene is particularly preferred.

Constituent a1) of the molding compositions may also contain, with corresponding reduction in the monomers a11), other monomers a12) which vary the mechanical and thermal properties of the core within a certain range. Examples of such monoethylenically unsaturated comonomers are:

vinylaromatic monomers, such as styrene and styrene derivatives of the formula I

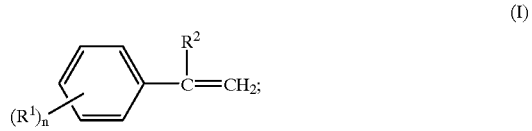

where $R^1$ and $R^2$ are hydrogen or $C_1$–$C_8$-alkyl and n is 0, 1, 2 or 3;

methacrylonitrile, acrylonitrile;

acrylic acid, methacrylic acid, and also dicarboxylic acids, such as maleic acid and fumaric acid and their anhydrides, such as maleic anhydride;

nitrogen-functional monomers, such as dimethylaminoethyl acrylate, diethylaminoethyl acrylate, vinylimidazole, vinylpyrrolidone, vinylcaprolactam, vinylcarbazole, vinylaniline, acrylamide;

$C_1$–$C_{10}$-alkylacrylates, such as methyl acrylate, ethyl acrylate, n-propyl acrylate, isopropyl acrylat, n-butyl acrylate, isobutyl acrylate, sec-butyl acrylate, tert-butyl acrylate, ethylhexyl acrylate, and the corresponding $C_1$–$C_{10}$-alkyl methacrylates, and hydroxyethyl acrylate;

aromatic and araliphatic (meth)acrylates, such as phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate;

N-substituted maleimides, such as N-methyl-, N-phenyl- and N-cyclohexylmaleimide;

unsaturated ethers, such as vinyl methyl ether and mixtures of these monomers.

Preferred monomers a12) are styrene, α-methylstyrene, n-butyl acrylate or mixtures of these, styrene and n-butyl acrylate or mixtures of these being particularly preferred and styrene being very particularly preferred. Styrene or n-butyl acrylate or mixtures of these are preferably used in amounts of, in total, up to 20% by weight, based on a1).

In a particular embodiment, use is made of a graft base made from, based on a1), a11) from 70 to 99.9, preferably from 90 to 99% by weight, of butadiene, and a12) from 0.1 to 30, preferably from 1 to 10% by weight, of styrene.

The graft a2) is present in a proportion of from 10 to 60% by weight, preferably from 15 to 55% by weight, and particularly preferably from 20 to 50% by weight, based on component A).

The graft a2) is obtained by polymerizing, based on a2), a21) from 65 to 95% by weight, preferably from 70 to 90% by weight, and particularly preferably from 75 to 85% by weight, of at least one vinylaromatic monomer, a22) from 5 to 35% by weight, preferably from 10 to 30% by weight, and particularly preferably from 15 to 25% by weight of acrylonitrile, a23) from 0 to 30% by weight, preferably from 0 to 20% by weight, and particularly preferably to 0 to 15% by weight, of at least one further monoethylenically unsaturated monomer.

Examples of vinylaromatic monomers can [sic] styrene and styrene derivatives of the formula (I)

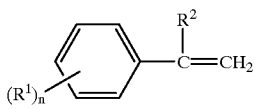

(I)

where $R^1$ and $R^2$ are hydrogen or $C_1-C_8$-alkyl and n is 0, 1, 2 or 3. Preference is given to the use of styrene.

Examples of other monomers a23) are the monomers given above for component a12). Methyl methacrylate and acrylates, such as n-butyl acrylate, are particularly suitable. Methyl methacrylate MMA is very particularly suitable as monomer a23), an amount of up to 20% by weight of MMA, based on a2), being preferred.

The graft polymers are prepared by emulsion polymerization, usually at from 20 to 100° C., preferably from 30 to 80° C. Additional use is usually made of customary emulsifiers, for example alkali metal salts of alkyl- or alkylarylsulfonic acids, alkyl sulfates, fatty alcohol sulfonates, salts of higher fatty acids having from 10 to 30 carbon atoms, sulfosuccinates, ether sulfonates or resin soaps. It is preferable to use the alkali metal salts, in particular the Na and K salts, of alkylsulfonates or fatty acids having from 10 to 18 carbon atoms.

The emulsifiers are generally used in amounts of from 0.5 to 5% by weight, in particular from 0.5 to 3% by weight, based on the monomers used in preparing the graft base a1).

In preparing the dispersion, it is preferable to use sufficient water to give the finished dispersion a solids content of from 20 to 50% by weight. A water/monomer ratio of from 2:1 to 0.7:1 is usually used.

Suitable free-radical generators for initiating the polymerization are those which decompose at the selected reaction temperature, ie. both those which decompose by themselves and those which do so in the presence of a redox system. Examples of preferred polymerization initiators are free-radical generators such as peroxides, preferably peroxosulfates (such as sodium or potassium peroxosulfate) and azo compounds, such as azodiisobutyronitrile. It is also possible, however, to use redox systems, especially those based on hydroperoxides, such as cumene hydroperoxide.

The polymerization initiators are generally used in amounts of from 0.1 to 1% by weight, based on the graft base monomers a11) and a12).

The free-radical generators and also the emulsifiers are added to the reaction mixture, for example, batchwise as a total amount at the beginning of the reaction or in stages, divided into a number of portions, at the beginning and at one or more later times, or continuously over a defined period. Continuous addition may also follow a gradient, which may, for example, rise or fall and be linear or exponential or even a step function.

It is also possible to include in the reaction molecular weight regulators, such as ethylhexyl thioglycolate, n-dodecyl or t-dodecyl mercaptan or other mercaptans, terpinols and dimeric α-methylstyrene or other compounds suitable for regulating molecular weight. The molecular weight regulators may be added to the reaction mixture batchwise or continuously, as described above for the free-radical generators and emulsifiers.

To maintain a constant pH, preferably of from 6 to 9, it is possible for the reaction to include buffer substances such as $Na_2HPO_4/NaH_2PO_4$, sodium hydrogencarbonate or buffers based on citric acid/citrate. Regulators and buffer substances are used in the customary amounts, and further details on this point are therefore unnecessary.

In a particularly preferred embodiment, a reductant is added during the grafting of the graft base a1) with the monomers a21) to a23).

In a particular embodiment, it is also possible to prepare the graft base by polymerizing the monomers a1) in the presence of a finely divided latex (the seed latex method of polymerization). This latex is the initial charge and may be made from monomers which form elastomeric polymers or else from other monomers mentioned above. Suitable seed latices are made from, for example, polybutadiene or polystyrene.

In another preferred embodiment, the graft base a1) may be prepared by the feed method. In this process, the polymerization is initiated using a certain proportion of the monomers a1), and the remainder of the monomers a1) (the feed portion) is added as feed during the polymerization. The feed parameters (gradient shape, amount, duration, etc.) depend on the other polymerization conditions. The principles of the descriptions given in connection with the method of addition of the free-radical initiator and/or emulsifier are once again relevant here. In the feed process, the proportion of the monomers a1) in the initial charge is preferably from 5 to 50% by weight, particulary preferably from 8 to 40% by weight, based on a1). The feed portion of a1) is preferably fed in within a period of from 1 to 18 hours, in particular from 2 to 16 hours, very particularly from 4 to 12 hours.

Graft polymers having a number of "soft" and "hard" shells, eg. of the structure a1)-a2)-a1)-a2) or a2)-a1)-a2), are also suitable, especially where the particles are of relatively large size.

The precise polymerization conditions, in particular the type, amount and method of addition of the emulsifier and of the other polymerization auxiliaries are preferably selected so that the resultant latex of the graft polymer A has a mean particle size, defined by the $d_{50}$ of the particle size distribution, of from 80 to 800, preferably from 80 to 600 and particularly preferably from 85 to 400.

The reaction conditions are preferably balanced so that the polymer particles have a bimodal particle size distribution, ie. a particle size distribution having two maxima whose distinctness may vary. The first maximum is more distinct (peak comparatively narrow) than the second and is generally at from 25 to 200 nm, preferably from 60 to 170 nm and particularly preferably from 70 to 150 nm.

The second maximum is broader in comparison and is generally at from 150 to 800 nm, preferably from 180 to 700, particularly preferably from 200 to 600 nm. The second maximum here (from 150 to 800 nm) is at larger particle sizes than the first maximum (from 25 to 200 nm).

The bimodal particle size distribution is preferably achieved by (partial) agglomeration of the polymer particles. This can be achieved, for example, by the following procedure: the monomers a1), which form the core, are polymerized to a conversion of usually at least 90%, preferably greater than 95%, based on the monomers used. This conversion is generally achieved in from 4 to 20 hours. The resultant rubber latex has a mean particle size dso of not more than 200 nm and a narrow particle size distribution (virtually monodisperse system).

In the second step, the rubber latex is agglomerated. This is generally done by adding a dispersion of an acrylate polymer. Preference is given to the use of dispersions of copolymers of $C_1$–$C_4$-alkyl acrylates, preferably of ethyl acrylate, with from 0.1 to 10% by weight of monomers which form polar polymers, examples being acrylic acid, methacrylic acid, acrylamide, methacrylamide, N-methylol methacrylamide and N-vinylpyrrolidone. Particular preference is given to a copolymer of 96% of ethyl acrylate and 4% of methacrylamide. The agglomerating dispersion may, if desired, also contain more than one of the acrylate polymers mentioned.

In general, the concentration of the acrylate polymers in the dispersion used for agglomeration should be from 3 to 40% by weight. For the agglomeration, from 0.2 to 20 parts by weight, preferably from 1 to 5 parts by weight, of the agglomerating dispersion are used for each 100 parts of the rubber latex, the calculation in each case being based on solids. The agglomeration is carried out by adding the agglomerating dispersion to the rubber. The addition rate is usually not critical, and the addition usually takes from 1 to 30 minutes at from 20 to 90° C., preferably from 30 to 75° C.

Besides an acrylate polymer dispersion, use may also be made of other agglomerating agents, such as acetic anhydride, for agglomerating the rubber latex. Agglomeration by pressure or freezing is also possible. The methods mentioned are known to the person skilled in the art.

Under the conditions mentioned, the rubber latex is only partially agglomerated, giving a bimodal distribution. More than 50%, preferably from 75 to 95%, of the particles (distribution by number) are generally in the non-agglomerated state after the agglomeration. The resultant partially agglomerated rubber latex is relatively stable, and it is therefore easy to store and transport it without coagulation occurring.

To achieve a bimodal particle size distribution of the graft polymer A), it is also possible to prepare, separately from one another in the usual manner, two different graft polymers A') and A") differing in their mean particle size, and to mix the graft polymers A') and A") in the desired mixing ratio.

The polymerization of the graft base a1) is usually carried out with reaction conditions selected to give a graft base having a particular crosslinked nature. Examples of parameters which are important for this are the reaction temperature and duration, the ratio of monomers, regulator, free-radical initiator and, for example in the feed process, the feed rate and the amount and timing of addition of regulator and initiator.

One method for describing the crosslinked nature of crosslinked polymer particles is measurement of the swelling index QI, which is a measure of the solvent-swellability of a polymer having some degree of crosslinking. Examples of customary swelling agents are methyl ethyl ketone and toluene. The QI of the novel molding compositions is usually in the range QI=from 10 to 60, preferably from 15 to 55 and particularly preferably from 20 to 50.

Another method for describing the extent of crosslinking is the measurement of $T_2$ times, the NMR relaxation times of protons capable of movement. The more strongly crosslinked a particular network is, the lower its $T_2$ times are. Customary $T_2$ times for the graft bases a1) according to the invention are in the range from 2.0 to 4.5 ms, preferably from 2.5 to 4.0 ms and particularly preferably from 2.5 to 3.8 ms, measured at 80° C. on specimens in film form.

Gel content is another criterion for describing the graft base and its extent of crosslinking, and is the proportion of material which is crosslinked and therefore insoluble in a particular solvent. It is useful to determine the gel content in the solvent also used for determining the swelling index. Gel contents of the graft bases a1) according to the invention are usually in the range from 50 to 90%, preferably from 55 to 85% and particularly preferably from 60 to 80%.

The following method may, for example, be used to determine the swelling index: about 0.2 g of the solid from a graft base dispersion converted to a film by evaporating the water is swollen in a sufficient quantity (eg. 50 g) of toluene. After, for example, 24 h, the toluene is removed with suction and the specimen is weighed. The weighing is repeated after the specimen has been dried in vacuo. The swelling index is the ratio of the specimen weight after the swelling procedure to the dry specimen weight after the second drying. The gel content is calculated correspondingly from the ratio of the dry weight after the swelling step to the weight of the specimen before the swelling step (×100%)

The $T_2$ time is determined by measuring the NMR relaxation of a specimen of the graft base dispersion from which water has been removed and which has been converted into a film. For this, the specimen is, for example, dried in air overnight, at 60° C. for 3 h in vacuo and then studied at 80° C. using a suitable measuring apparatus, eg. Bruker minispec. It is only possible to compare specimens studied by the same method, since the relaxation is markedly temperature-dependent.

The graft a2) may be prepared under the same conditions as those used for preparation of the graft base a1) and may be prepared in one or more process steps. In two-stage grafting, for example, it is possible to polymerize styrene and/or α-methylstyrene alone, and then styrene and acrylonitrile, in two sequential steps. This two-step grafting (firstly styrene, then styrene/acrylonitrile) is a preferred embodiment. Further details concerning the preparation of the graft polymers A) are given in DE-OS 12 60 135 and 31 49 358.

It is advantageous in turn to carry out the graft polymerization onto the graft base a1) in aqueous emulsion. It may be undertaken in the same system used for polymerizing the graft base, and further emulsifier and initiator may be added. These need not be identical with the emulsifiers and/or initiators used for preparing the graft base a1). For example, it may be expedient to use a persulfate as initiator for preparing the graft base a1) but a redox initiator system for polymerizing the graft shell a2). Otherwise, that which was said for the preparation of the graft base a1) is applicable to the selection of emulsifier, initiator and polymerization auxiliaries. The monomer mixture to be grafted on may be added to the reaction mixture all at once, in portions in more than one step-or, preferably, continuously during the polymerization.

If non-grafted polymers are produced from the monomers a2) during the grafting of the graft base a1), the amounts, which are generally less than 10% by weight of a2), are attributed to the weight of component A).

Component B) is a thermoplastic polymer and is present in the novel molding compositions in a proportion of from 20 to 95% by weight, preferably from 30 to 90% by weight and particularly preferably from 40 to 85% by weight, based on the total of components A) and B), and, if present, C), D), E) and F).

Component B) is obtained by polymerizing, based on B), b1) from 69 to 81% by weight, preferably from 70 to 78% by weight and particularly preferably from 70 to 77% by weight, of at least one vinylaromatic monomer b2) from 19 to 31% by weight, preferably from 22 to 30% by weight and particularly preferably from 23 to 30% by weight, of acrylonitrile b3) from 0 to 30% by weight, preferably from 0 to 28% by weight, of at least one other monoethylenically unsaturated monomer.

Suitable vinylaromatic monomers b1) are styrene and styrene derivatives of the formula (I) as described for component a21). Preference is given to the use of styrene and/or α-methylstyrene.

In a preferred embodiment, the graft a2) of the graft polymer A) consists essentially of, based on A2 [sic]), a21) from 75 to 85% by weight of styrene and/or α-methylstyrene a22) from 15 to 25% by weight of acrylonitrile, and the thermoplastic polymer B) consists essentially of, based on B), b1) from 71 to 78% by weight of styrene, and b2) from 22 to 29% by weight of acrylonitrile.

In a particular embodiment, component B) consists of two polymers B') and B"). The polymer B') here corresponds to the polymer B) described above, where the vinylaromatic monomers b1') are only those of the formula (I) which have $R^1$ and $R^2$ as hydrogen, ie. non-alkylated vinylaromatics. Styrene is preferred as monomer b1') in B').

The polymer B") corresponds to the polymer B) described above, where the vinylaromatic polymers b1") are only those of the formula (I) which have $R^1$ and $R^2$ as $C_1$–$C_8$-alkyl, ie. alkylated vinylaromtics. α-Methylstyrene is preferred as monomer b1") in B").

Polymer B") is preferably an α-methylstyrene-acrylonitrile copolymer. If component B) comprises two components B') and B"') [sic], it particularly preferably consists of a styrene-acrylonitrile copolymer B') and an α-methylstyrene-acrylonitrile polymer B").

If B) consists of B') and B"), the ratio B')/B") is preferably from 99:1 to 1:99, preferably from 95:5 to 5:95.

The other monomers b3) may be the monomers mentioned earlier for component a12). Particularly suitable monomers are methyl methacrylate and N-alkyl- and/or N-arylmaleimides such as N-phenylmaleimide.

The polymers B), which due to their main components styrene and acrylonitrile are generally also referred to as SAN polymers, are known and in some cases also commercially available.

Component B) has a viscosity number VN (determined according to DIN 53 726 at 25° C. on a 0.5% strength by weight solution of component B) in dimethylformamide) of from 50 to 120 ml/g, preferably from 52 to 110 ml/g and particularly preferably from 55 to 105 ml/g. It is obtained in a known manner by bulk, solution, suspension, precipitation or emulsion polymerization, bulk and solution polymeriza-tion being preferred. Details of these processes are described, for example, in Kunststoffhandbuch, ed. R. Vieweg and G. Daumiller, Vol. V "Polystyrol", Carl-Hanser-Verlag Munich, 1969, p. 118 ff.

Component C) is likewise a thermoplastic polymer and is present in the novel molding compositions in a proportion of from 0 to 50% by weight, preferably from 0 to 48% by weight and particularly preferably from 0 to 45% by weight, based on the total of components A) and B), and, if present, C), D), E) and F).

Component C) is obtained by polymerizing, based on C), c1) from 69 to 81% by weight, preferably from 71 to 78% by weight and particularly preferably from 72 to 77% by weight, of at least one vinylaromatic monomer, c2) from 19 to 31% by weight, preferably from 22 to 29% by weight and particularly preferably from 23 to 28% by weight, of acrylonitrile, and c3) from 0 to 40% by weight, preferably from 0 to 30% by weight, of at least one other monoethylenically unsaturated monomer.

Suitable vinylaromatic monomers c1) are styrene and styrene derivatives of the formula (I), as described for component a21). The use of styrene is preferred. The other monomers c3) may be the monomers mentioned earlier for components a12). Particularly suitable monomers are methyl methacrylate, maleic anhydride and N-phenylmaleimide.

Component C) has a viscosity number VN of from 50 to 120 ml/g, preferably from 52 to 110 ml/g and particularly preferably from 55 to 105 ml/g. It is obtained in a known manner by bulk, solution, suspension, precipitation or emulsion polymerization, bulk and solution polymerization being preferred. Details of these processes are given, for example, in Kunststoffhandbuch, ed. R. Vieweg and G. Daumiller, Vol. V "Polystyrol", Carl-Hanser-Verlag Munich, 1969, p. 118 ff.

Components B) and C) are thus polymers of the SAN type incorporating comparatively little acrylonitrile (not more than 31% by weight). According to the invention, the difference between B) and C) is either that the viscosity numbers VN of B) and C) differ by at least 5 units [ml/g] (in this case, the mean molar masses $\overline{M}$ of B) and C) are different from one another), or that the acrylonitrile contents of B) and C) (monomers b2) and c2), respectively) differ by at least 5 units [% by weight], or that both characteristics mentioned above, viscosity number VN and acrylonitrile content, differ by at least 5 units.

Component D) is also a thermoplastic polymer and is present in the novel molding compositions in a proportion from 0 to 95% by weight, preferably from 0 to 80% by weight and in particular from 0 to 70% by weight, based on the total of components A) and B), and C), D), E) and F) if they are present. Component D) is obtained by polymerizing, based on D), d1) from 63 to less than 69% by weight, preferably from 64 to 68% by weight, of at least one vinylaromatic monomer, d2) from 31 to 37% by weight, preferably from 32 to 36% by weight, of acrylonitrile, d3) from 0 to 40% by weight, preferably from 0 to 30% by weight, of at least one other monoethylenically unsaturated monomer.

Suitable vinylaromatic monomers d1) are styrene and styrene derivatives of the formula (I), as described for component a21). Preference is given to the use of styrene and/or α-methylstyrene, particularly styrene. The other monomer d3) may be the monomers mentioned earlier for component a21). Particularly suitable monomers are methyl methacrylate, maleic anhydride, N-phenylmaleimide and other N-substituted maleimides.

Thus, component D), like components B) and C), is an SAN polymer, but differs from B) and C) by a low content of vinylaromatic monomers d1) and a higher content of acrylonitrile d2) (more than 31% by weight).

Component D) generally has a viscosity number VN of from 55 to 110 ml/g, preferably from 56 to 105 ml/g and particularly preferably from 58 to 103 ml/g. Component D) is obtained in a known manner by bulk, solution, suspension, precipitation or emulsion polymerization. Details of these processes are described, for example, in Kunststoffhandbuch, ed. R. Vieweg and G. Daumiller, Vol. V "Polystyrol", Carl-Hanser-Verlag Munich 1969, p. 118 ff.

Component E) is also a thermoplastic polymer and is present in the novel molding compositions in a proportion of from 0 to 50% by weight, preferably from 0 to 40% by weight and particularly preferably from 0 to 30% by weight, based on the total of components A) and B), and C), D), E) and F) if they are present. Component E) is obtained by polymerizing, based on E), e1) from 4 to 96% by weight, preferably from 8 to 92% by weight and particularly preferably from 10 to 90% by weight, of at least one vinylaromatic monomer, e2) from 4 to 96% by weight, preferably from 8 to 92% by weight and particularly preferably from 10 to 90% by weight, of at least one monomer selected from the class consisting of maleic anhydride, maleimides, $C_1$–$C_{20}$-alkyl acrylates and $C_1$–$C_{20}$-alkyl methacrylates, e3) from 0 to 50% by weight, preferably from 0 to 40% by weight and particularly preferably from 0 to 30% by weight of acrylonitrile.

Suitable vinylaromatic monomers e1) are styrene and styrene derivatives of the formula (I), as described for a21). Preference is given to the use of styrene and/or α-methylstyrene. Among the $C_1$–$C_{20}$-alkyl methacrylates (one of the monomers e2)), preference is given to methyl methacrylate MMA. Particularly preferable components E) are copolymers of styrene and maleic anhydride or of styrene and maleimides, or of styrene, maleimides and MMA or of styrene, maleimides and acrylonitrile, or of styrene, maleimides, MMA and acrylonitrile.

According to the invention, the monomers e1) to e3) are selected so that the polymer E) differs from the polymers B) and, if they are also present in the molding compositions, C) and D). The polymers E) can serve to increase the heat resistance of the thermoplastic molding compositions.

Component E) generally has a viscosity number VN of from 50 to 120 ml/g, preferably from 55 to 110 ml/g. Component E) is obtained in a known manner by bulk, solution, suspension, precipitation or emulsion polymerization. Details of these processes are described, for example, in Kunststoffhandbuch, ed. R. Vieweg and G. Daumiller, Vol. V "Polystyrol", Carl-Hanser-Verlag Munich, 1969, p. 118 ff.

Component F) consists of additives which are present in the novel thermoplastic molding compositions in a proportion of from 0 to 50% by weight, preferably from 0.1 to 45% by weight and particularly preferably from 0.2 to 30% by weight, based on the total of components A) and B), and C), D), E) and F) if they are present.

Component F) includes lubricants or mold-release agents, waxes, pigments, dyes, flame retardants, antioxidants, stabilizers to counter the action of light, fibrous and pulverulent fillers, fibrous and pulverulent reinforcing agents, antistats and other additives, or mixtures of these.

Examples of suitable lubricants and mold-release agents are stearic acids, stearyl alcohol, esters or amides of stearic acid, silicone oils, montan waxes and polyethylene- and polypropylene-based lubricants.

Examples of pigments are titanium dioxide, phthalocyanines, ultramarine blue, iron oxides and carbon black, and the entire class of organic pigments.

For the purposes of the invention, dyes are all dyes which can be used for the transparent, semitransparent or non-transparent coloration of polymers, in particular those which are suitable for coloration of styrene copolymers. Dyes of this type are known to the person skilled in the art.

Examples of flame retardants are the halogen- or phosphorus-containing compounds known to the person skilled in the art, magnesium hydroxide and other customary compounds or mixtures of these. Red phosphorus is also suitable.

Particularly suitable antioxidants are sterically hindered mono- or polynuclear phenolic antioxidants, which may be substituted in various ways and also bridged via substituents. These include not only monomeric but also oligomeric compounds, which may be built up from more than one fundamental phenol unit. Hydroquinones and substituted compounds which are hydroquinone analogs are also suitable, as are antioxidants based on tocopherols and their derivatives. Mixtures of different antioxidants may also be used. In principle, it is possible to use any compound which is commercially available or suitable for styrene copolymers, such as Topanol® or Irganox®.

Alongside the phenolic antioxidants mentioned as examples above, it is possible to use costabilizers, in particular phosphorus- or sulfur-containing costabilizers. Such phosphorus- or sulfur-containing costablizers are known to the person skilled in the art and are commercially available.

Examples of suitable stabilizers to counter the action of light are various substituted resorcinols, salicylates, benzotriazoles, benzophenones and HALS (hindered amine light stabilizers), commercially available, for example, as Tinuvin®.

Examples of fibrous and/or particulate fillers are carbon fibers or glass fibers in the form of glass fabrics, glass mats or glass fiber rovings, chopped glass or glass beads, and wollastonite, particularly preferably glass fibers. If glass fibers are used, these may be provided with a size and a coupling agent for better compatibility with the blend components. The glass fibers may be incorporated either in the form of short glass fibers or in the form of continuous strands (rovings).

Suitable particulate fillers are carbon black, amorphous silicic acid, magnesium carbonate (chalk) [sic], powdered quartz, mica, mica [sic], bentonites, talc, feldspar or in particular calcium silicates, such as wollastonite, and kaolin.

Examples of suitable antistats are amine derivatives, such as N,N-bis(hydroxyalkyl)alkylamines or -alkyleneamines, polyethylene glycol esters, copolymers of ethylene glycol and propylene glycol, and glycerol mono- and distearates, and mixtures of these.

The individual additives are used in the usual amounts in each case, and further details on this point are therefore unnecessary.

Details concerning the preparation of the thermoplastic molding compositions are as follows:

The graft polymers having bimodal particle size distribution are prepared by emulsion polymerization, as described above for component A). As described above, suitable measures are taken in order to establish the bimodal particle size distribution, preference being given to (partially) agglomerating the polymer particles, as mentioned, by adding a polyacrylate dispersion which has agglomerating effect. Instead of this, or combined with the (partial) agglomeration, it is possible to use other suitable measures familiar to the person skilled in the art to establish the bimodal particle size distribution.

The resultant dispersion of the graft polymer A) may either be mixed directly with the components B) to F) or worked up prior to this. The latter procedure is preferred.

The dispersion of the graft polymer A) is worked up in a manner known per se. The graft polymer A) is usually firstly precipitated from the dispersion, for example by adding acids (such as acetic acid, hydrochloric acid or sulfuric acid) or salt solutions (such as calcium chloride, magnesium sulfate or alum) which can bring about precipitation, or else by freezing (freeze coagulation). The aqueous phase may be removed in a usual manner, for example screening, filtering, decanting or centrifuging. This preliminary removal of the dispersion water gives graft polymers A) which are moist with water and have a residual water content of up to 60% by weight, based on A), where the residual water may, for example, either adhere externally to the graft polymer or else be enclosed within it.

After this, the graft polymer may, if required, be dried in a known manner, for example by hot air or using a pneumatic dryer. It is likewise possible to work up the dispersion by spray drying.

According to the invention, the graft polymers A) are mixed in a mixing apparatus with the polymer B) and the other components C), D), E) and/or F) if they are present, giving an essentially molten polymer mixture.

"Essentially molten" means that the polymer mixture may contain, besides the predominant molten (softened) fraction, a certain proportion of solid constituents, for example unmelted fillers and reinforcing materials, such as glass fibers, metal flakes or even unmelted pigments, dyes, etc. "Molten" means that the polymer mixture flows at least to some extent, ie. that it is softened at least to the extent of having plastic properties.

The mixing apparatuses used are those known to the person skilled in the art. Components A) and B) and C), D), E) and F) if they are present may be mixed, for example, by extruding, kneading or rolling them together, components A) to F) having been previously isolated if necessary from the solution resulting from the polymerization or from the aqueous dispersion.

If one or more components are incorporated in the form of an aqueous dispersion or of an aqueous or non-aqueous solution, the water or the solvent is removed from the mixing apparatus, preferably an extruder, via a devolatilizing unit.

Examples of mixing apparatuses for the novel process are discontinuously operating heated internal mixers with or without rams, continuously operating kneaders, such as continuous internal mixers, screw compounders having axially oscillating screws, Banbury mixers, and also extruders, roll mills, mixing rolls where the rolls are heated and calenders.

Preference is given to using an extruder as mixing apparatus. Single- or twin-screw extruders, for example, are particularly suitable for extruding the melt. A twin-screw extruder is preferred.

In many cases, the mechanical energy introduced by the mixing apparatus during the mixing process is sufficient to bring about melting of the mixture, and therefore it is not necessary to heat the mixing apparatus. Otherwise, the mixing apparatus is generally heated. The temperature depends on the chemical and physical properties of components A) and B), and C), D), E) and F) if they are present, and should be selected so that an essentially molten polymer mixture is produced. To avoid thermal degradation of the polymer mixture, on the other hand, the temperature should not be excessive. The mechanical energy introduced may, however, even be sufficient to require actual cooling of the mixing apparatus. The mixing apparatus is usually operated at from 150 to 300° C., preferably from 180 to 300° C.

In a preferred embodiment, the graft polymer A) is mixed with the polymer B) and the other components C), D), E) and/or F), if they are present, in an extruder, the dispersion of the graft polymer A) being metered into the extruder without prior removal of the dispersion water. The water is usually removed over the length of the extruder via suitable venting systems. Examples of venting systems are vents provided with retaining screws (which prevent the emergence of the polymer mixture).

In another embodiment which is also preferred, the graft polymer A) is mixed with the polymer B) and the other components C), D), E) and/or F), if they are present, in an extruder, the graft polymer A) having previously been separated from the dispersion water. This prior removal of the dispersion water gives graft polymers A) which are moistened with water and have a residual water content of up to 60% by weight, based on A), where the residual water may, for example, either adhere externally to the graft polymer or else be enclosed therein. The residual water which is present may then, as described above, be removed as steam via venting systems in the extruder.

In a particularly preferred embodiment, however, the residual water in the extruder is not solely removed as steam; instead, some of the residual water is removed mechanically in the extruder and leaves the extruder in the liquid phase. This process will now be described below in more detail:

For this process, the graft polymer is separated beforehand from the dispersion water, for example by screening, pressing, filtering, decanting, sedimenting or centrifuging, or by drying involving heat to some extent. The graft polymer from which water has been partially removed in this manner and which contains up to 60% by weight of residual water is then metered into the extruder.

The material metered in is conveyed by the screw against a retarding element which acts as an obstacle and is generally located at the end of a "squeeze section". This restricted flow zone builds up a pressure which presses ("squeezes") the water out of the graft polymer. Different pressures may be built up, depending on the rheological behavior of the rubber, by varying the arrangement of screw elements, kneading elements or other retarding elements. In principle, any commercially available element which serves to build up pressure in the apparatus is suitable.

Examples of possible retarding elements are pushed-over, conveying screw elements screw elements having a pitch opposite to the conveying direction, including screw elements having conveying threads of large pitch (pitch larger than the diameter of the screw) opposite to the conveying direction (termed LGS elements)

kneading blocks having non-conveying kneading disks of different width kneading blocks having a back-conveying pitch kneading blocks having a conveying pitch barrel disks, eccentric disks and blocks configured therefrom neutral retarding disks (baffles)

mechanically adjustable restrictors (sliding barrel, radial restrictors, central restrictors).

Two or more of the retarding elements may be combined with one another. The retarding effect of the restricted flow zone can also be adapted to the respective graft rubber by adjusting the length and the intensity of the individual retarding elements.

In the squeeze section described, the screw elements located before the restricted flow zone (before the first retarding element) are generally constructed as conventional conveying screws. In a preferred embodiment, use is made of conveying screws whose pitch increases toward the restricted flow zone, ie. becomes steeper. This design brings about a relatively slow pressure build-up and is termed a transition section, which can be advantageous for the removal of water from certain rubbers.

In another preferred embodiment, the pressure is built up without a prior transition section, that is to say immediately before and/or in the restricted flow zone (ie. the conveying screw has constant pitch in the squeeze section).

In the squeeze section, it is preferable if all of the design parameters and operating parameters of the extruder are balanced so that, although the elastomer material is conveyed and compressed at the selected rotation rate of the screw, it is not, or is only to a subordinate extent, plasticized or partly melted, and is not completely melted.

The squeeze section of the extruder preferably contains, to build up pressure, screw elements having a pitch opposite to the conveying direction and/or appropriate kneading blocks.

The water pressed out of the graft polymer in the squeeze section leaves the extruder in the liquid phase and not as steam. In a less preferred embodiment, up to 20% by weight of the water removed in this section emerges as steam.

The squeeze section is provided with one or more water-removal orifices, which are normally under atmospheric pressure. "Under atmospheric pressure" means that the water emerges from the water-removal orifices under atmospheric pressure. The water-removal orifices are preferably located on the upper side of the extruder, but arrangements which are lateral or face downward are also possible. The water-removal orifices are moreover preferably provided with an apparatus which prevents discharge of the graft polymer A) which is being conveyed. Retaining screws are particularly preferred for this purpose.

The water-removal orifices are designed in a manner known per se. It is preferable to use water-removal orifices whose dimensions are selected so that they cannot be blocked by the contents of the extruder. Cut-outs or holes in the extruder barrel are particularly preferably used as water-removal orifices.

In a particularly preferred embodiment, the water-removal orifices are not Seiher housings or similar rapidly blocking components, such as screens. As previously described, Seiher housings are in fact susceptible to blocking.

The water-removal orifice associated with the retarding elements is located at a distance of at least one screw diameter $D_{screw}$, preferably at from 1 to 4 $D_{screw}$, and very particularly preferably from 1 to 2 $D_{screw}$, upstream of the retarding element or, in the case of more than one retarding element, upstream of the first retarding element. For the purposes of the invention, distance is the path length from the middle of the water-removal orifice to the beginning of the first retarding element.

This distance between retarding elements and water-removal orifice ensures that the water-removal orifice is not situated in the area of the extruder in which the pressure of the polymer conveyed against the retarding elements is very high (pressure maximum). The sealing of the orifices to prevent polymer discharge therefore generally requires only technically simple apparatuses, such as retaining screws.

The temperature of the water discharged is generally from 20 to 95° C. and preferably from 25 to 70° C., measured at the discharge orifice. In the first squeeze section, depending on the elastomer component and the residual water initially present, from 10 to 90% by weight, preferably from 20 to 80% by weight, of the residual water initially present is usually removed.

In a preferred embodiment, the extruder is not heated in the feed sections and the squeeze sections. In one embodiment, the extruder is cooled in these particular sections.

The partially dewatered graft polymer A) is conveyed through the restricted flow zones and passes to the next extruder section.

In an embodiment which is preferred for preparing some impact-modified thermoplastics, a second squeeze section follows the first squeeze section just described, and again consists of a conveying section and a restricted flow zone which acts as an obstruction. The same details for the first squeeze section essentially apply to the second squeeze section, particularly concerning the distance of the water-removal orifice from the downstream restricted flow zone.

The water which is pressed out generally leaves the extruder through all of the water-removal orifices which are present. Depending on the properties of the elastomer component and its residual water content, it is also possible, however, that the water which has been squeezed out is discharged from only one or a few of the available water-removal orifices, and the other water-removal orifices are "dry", ie. bring out no or virtually no water. This has not proven at all disadvantageous.

The mechanically by being pressed out (squeezed out) can be removed mechanically by being pressed out (squeezed out) can be removed as steam in a usual manner via venting systems in the extruder.

It is preferable if at least 30% by weight of the residual water (which, for example, may adhere externally to the graft polymer A) and/or be enclosed therein) is pressed out in the extruder in the form of liquid water. From 30 to 90% by weight of the residual water is generally removed in liquid form by squeezing, and from 10 to 70% by weight as steam via venting systems.

If an extruder is used as mixing apparatus for components A) and B), and, if present, C), D), E) and F), the different sections of the extruder may, as is generally known, be individually heated or cooled, so as to set an ideal temperature profile along the screw axis. The person skilled in the art is also familiar with the fact that the individual sections of the extruder can generally have different lengths.

The temperatures and lengths to be chosen for the individual sections in a particular case differ depending on the chemical and physical properties of components A) and B), and, if present, C), D), E) and F) as well as their mixing ratios. This applies also to the screw rotation rate, which can vary within a wide range. Rotation rates of the extruder screws in the range from 100 to 350 $min^{-1}$ may be mentioned merely as examples.

According to the invention, the essentially molten polymer mixture prepared in the mixing apparatus from components A) and B), and, if present, C), D), E) and F) is subjected to rapid cooling.

The rapid cooling is usually carried out by bringing the essentially molten polymer mixture (given the abbreviated term "polymer melt" below) into contact with a cold medium or surface.

"Cold" here is taken to imply a temperature which is sufficiently far below that of the polymer melt for the polymer melt to cool rapidly when contact is made. "Cold" therefore does not always mean cooled. For example, a polymer melt at 200° C. may be subjected to rapid cooling by water which has previously been heated to, for example, from 30 to 90° C. The decisive factor is that the difference between the polymer melt temperature and the temperature of the cold medium or surface suffices for rapid cooling of the melt.

The polymer melt is preferably cooled rapidly using a cold medium. Media of this type may be gases or liquids.

Examples of cold gaseous media (termed cooling gases below) are cooled or uncooled air or, particularly for polymer melts which are easily oxidized, gases such as carbon dioxide, nitrogen or noble gases. Air or nitrogen is preferably used as cooling gas. The cooling gas is generally blown onto the polymer melt discharging from the mixing apparatus.

Cold liquid media (termed "cooling liquids" below) may be organic or inorganic cooling liquids. Examples of suitable organic cooling liquids are oils and other high-boiling liquid organic materials which do not interact chemically or physically (eg. swelling, solvent attack, etc.) with the polymer melt to be cooled, ie. are chemically and physically inert to the polymer melt.

Preference is given to the use of inorganic cooling liquids, in particular aqueous solutions and water. Particular preference is given to water, which may be used cooled (freezing point to room temperature), uncooled or heated (room temperature to boiling point).

The cooling liquid is generally sprayed onto the discharging polymer melt; or the polymer melt discharges from the mixing apparatus directly into a bath of the cooling liquid. It is also possible to apply the cooling liquid to the discharging polymer melt in the form of a wide jet of liquid (flood).

Spraying the polymer melt with cooling liquid is particularly advantageous when the mixing apparatus used is one which produces sheeting (for example roll mills, mixing rolls and calenders). The polymer melt being discharged in the form of a film solidifies on being sprayed with cooling liquid, to give sheeting.

The polymer melt is particularly preferably discharged directly from the mixing apparatus into a bath of the cooling liquid, very particularly preferably into a waterbath.

It is also possible, and in some cases preferable, for the polymer melt being discharged from the mixing apparatus to be firstly only slightly cooled by bringing it into contact with a cooling gas, for example by blowing onto it heated air or nitrogen gas. This solidifies only the outer surface of the melt, but the interior of the polymer remains molten. The actual rapid cooling is then carried out by bringing the melt, previously solidified at the surface, into contact with a cooling liquid, for example water, whereupon the interior of the melt also sets hard.

The extrudates of the polymer melt being discharged from the die head of the extruder may, for example, initially be solidified superficially by blowing air onto them and then carried over into a waterbath, where the actual rapid cooling takes place.

The polymer melt which has been hardened by the rapid cooling may be further processed in a manner known to the person skilled in the art. The solidified polymer is generally comminuted by grinding, chopping, granulating or other processes.

In a particularly preferred embodiment, the rapid cooling and the comminution is undertaken by the underwater granulation process. In underwater granulation, the polymer melt is discharged from the mixing apparatus via a die plate in which the holes (nozzles) are preferably round and arranged in the shape of a circle. The die plate is located underwater or is sprayed with water, and this may be done under an inert gas. Immediately behind the die plate on its outer side there are cutting apparatus, preferably rotating knives, which separate the polymer as it is discharged. The polymer is therefore separated by rotating knives and rapidly cooled in water, generally solidifying to give bead-like, to some extent round, grains.

Arrangements of the holes having other than circular shape and shapes of the holes which are other than round are, however, commonly found in the die plate.

In another embodiment, a process termed underwater extrudate granulation is used. For this, the melt is discharged as extrudate from a die plate and is immediately wetted and rapidly cooled by a stream of water and is then introduced, via a sloping plane, into a waterbath, and is granulated after cooling.

In a very particularly preferred embodiment, an extruder is used as mixing apparatus for components A) and B), and, if present, C), D), E) and F), with the underwater granulation just described. The discharge orifice of the extruder in this embodiment is therefore a die plate located underwater (or sprayed with water) and having cutting apparatus, in particular rotating knives.

Preference is therefore given to thermoplastic molding compositions comprising the components A) and B) described above and, if present, C), D), E) and F), with butadiene as conjugated diene a11), obtainable by 1) preparing the graft polymers A) by emulsion polymerization to give a polymer A) which is moist with water and contains up to 60% by weight, based on A), of residual water, 2) mixing the graft polymer A), which is moist with water, with the other components B) to F) in an extruder to give an essentially molten polymer mixture and pressing out at least 30% by weight of the residual water of the moist graft polymer A) as liquid water, by build-up of pressure in the extruder, 3) rapid cooling of the essentially molten polymer mixture by the underwater granulation process.

The novel thermoplastic molding compositions may be processed by the known methods of thermoplastic processing, ie. for example by extrusion, injection molding, calendering, blowmolding, compression molding or sintering.

The novel molding compositions have good mechanical properties, in particular good toughness and also good low-temperature toughness and a balanced relationship of toughness and stiffness. Their rubber-glass transition is improved. The compositions have little intrinsic color (Yellowness Index YI<25) and only a low yellowing tendency, and show only little yellowing, even after prolonged heat aging or as a result of hot processing. The molding compositions when colored, moreover, have good depth of color (low light scattering, with scattering values <4.9).

EXAMPLES

1. Preparation of the Graft Polymer A)

1.1. Preparation of the Graft Base a1)

43120 g of the monomer mixture given in Table 1 were polymerized at 65° C. in the presence of 432 g of tertdodecyl mercaptan (TDM), 311 g of the potassium salt of $C_{12}$–$C_{20}$ fatty acids, 82 g of potassium persulfate, 147 g of sodium hydrogencarbonate and 58400 g of water, to give a polybutadiene latex. The detailed procedure was as described in EP-A 62901, Ex. 1, p 9, line 20-p. 10, line 6, the TDM being added in one portion at the start of the reaction, unless otherwise stated. The conversion was 95% or greater. The mean particle size $d_{50}$ of the latex was from 80 to 120 nm and the swelling index was greater than 18. The $T_2$ time determined by NMR was from 2.5 to 3.5 ms.

To agglomerate the latex, 35000 g of the resultant latex were agglomerated (partial agglomeration) at 65° C. by adding 2700 g of a dispersion (solids content 10% by weight) of 96% by weight of ethyl acrylate and 4% by weight of methacrylamide.

1.2. Preparation of the Graft a2)

9000 g of water, 130 g of the potassium salt of $C_{12}$–$C_{20}$ fatty acids and 17 g of potassium peroxodisulfate were added to the agglomerated latex. The monomer mixtures given in Table 2 were then added at 75° C. with stirring, within a period of 4 hours. The conversion, based on the graft monomers, was virtually quantitative.

The resultant graft polymer dispersion, which had bimodal particle size distribution, had a mean particle size $d_{50}$ of from 150 to 350 nm and a $d_{90}$ of from 400 to 600 nm. The particle size distribution had a first maximum in the range from 50 to 150 nm and a second maximum in the range from 200 to 600 nm.

The resultant dispersion was mixed with an aqueous dispersion of an antioxidant and then coagulated by adding a magnesium sulfate solution. The coagulated rubber was centrifuged off from the dispersion water and washed with water, giving a rubber with about 30% by weight of adhering or enclosed residual water.

TABLE 1

| Example | \multicolumn{8}{c}{Graft base} |
|---|---|---|---|---|---|---|---|---|
| | K1 | K2 | K3 | K4 | K5a *) | K5b | K6 | K7 |
| Monomers [% by weight] | | | | | | | | |
| Butadiene | 100 | 97 | 95 | 97 | 95 | 95 | 93 | 90 |
| Styrene | 0 | 0 | 0 | 3 | 5 | 5 | 7 | 10 |
| n-Butyl acrylate | 0 | 3 | 0 | 0 | 0 | 0 | 0 | 0 |
| Properties: | | | | | | | | |
| Swelling index | 32 | 14 | 16 | 12 | 43 | 33 | 27 | 25 |
| Gel content [%] | 70 | 90 | 86 | 92 | 62 | 66 | 73 | 73 |
| Light scattering | 82 | 82 | 81 | 78 | 78 | 80 | 81 | 74 |

*) procedure changed: initial charge of the entire styrene amount + 20% by weight of the butadiene + 20% of the TDM, meter in the remaining 80% by weight of the butadiene within a period of 5 hours, during this add the 0.2% by weight of the remaining TDM per hour.

TABLE 2

| | \multicolumn{7}{c}{Graft and finished graft polymer A)} |
|---|---|---|---|---|---|---|---|
| Komponent | A1 | A2 | A3 | A4 | A5 | A6 | A7 |
| Graft base from Example | K1 | K1 | K1 | K1 | K1 | K4 | K5a |
| Monomers [% by weight] | | | | | | | |
| Styrene | 83 | 80 | 78 | 75 | 70 | 80 | 60 |
| Acrylonitrile | 17 | 20 | 22 | 25 | 30 | 20 | 20 |

TABLE 2-continued

| | \multicolumn{7}{c}{Graft and finished graft polymer A)} |
|---|---|---|---|---|---|---|---|
| Komponent | A1 | A2 | A3 | A4 | A5 | A6 | A7 |
| Properties: | | | | | | | |
| Yellowness Index YI of the graft polymer | 9.0 | 9.3 | n.d. | n.d. | 19.9 | 13.6 | 15.7 |

(n.d. not determined)

2. Preparation of the Polymers B), C), D) and E)

The thermoplastic polymers B) to E) were prepared by continuous solution polymerization, as described in Kunststoff-Handbuch, ed. R. Vieweg and G. Daumiller, Vol, V "Polystyrol", Carl-Hanser-Verlag, Munich, 1969, p. 122–124. Table 3 gives the formulations and properties.

TABLE 3

| | \multicolumn{6}{c}{Components B) to D)} |
|---|---|---|---|---|---|---|
| Component | B1 | B2 | B3 | C1 | C2 | D1 |
| Monomers [% by weight] | | | | | | |
| Styrene | 75 | 75 | 0 | 75 | 75 | 67 |
| α-Methylstyrene | 0 | 0 | 70 | 0 | 0 | 0 |
| Acrylonitrile | 25 | 25 | 30 | 25 | 25 | 33 |
| Viscosity number VN [ml/g] | 67 | 80 | 80 | 80 | 100 | 60 |

Component E1) is a copolymer of 63% by weight of styrene, 13% by weight of acrylonitrile and 25% by weight of N-phenylmaleimide having a Vicat B softening point of 144° C. Component E2) is a copolymer of 59% by weight of styrene and 41% by weight of N-phenylmaleimide.

3. Preparation of Component F)

Component F1

60% by weight of a pigment made from titanium dioxide and 40% by weight of component B2 were intimately mixed in an extruder/kneader/etc., discharged and granulated after cooling.

4. Preparation of the Blends 4.1. Blending After Prior Drying of the Graft Rubber A)

The graft rubber A) containing residual water was dried using hot air in vacuo and intimately mixed with the other components B) to F) in a Werner and Pfleiderer ZSK 30 extruder at 250° C. and 250 min$^{-1}$, at a throughput of 10 kg/h. The molding composition was extruded and the molten polymer mixture was subjected to rapid cooling by being conducted into a waterbath at 30° C. The hardened molding composition was granulated.

4.2. Blending without Prior Drying of the Graft Rubber A)

The graft rubber A) containing residual water was metered into a Werner and Pfleiderer ZSK 40 extruder in which the front part of the two conveying screws were provided with retarding elements which build up pressure. A considerable part of the residual water was pressed out mechanically in this way and left the extruder in liquid form through water-removal orifices. The other components B) to F) were added to the extruder downstream behind the restricted flow zones, and intimately mixed with the dewatered component A). The residual water still present was removed as steam via venting orifices in the rear part of the extruder. The extruder was operated at 250 min$^{-1}$ and with a throughput of 80 kg/h. The molding composition was extruded and the molten polymer mixture was subjected to rapid cooling by being passed into a waterbath at 25° C. The hardened molding composition was granulated.

The components used and their constituent amounts are given in Table 4.

5. Measurements Carried Out

Swelling index of the graft base: a film was prepared from the aqueous dispersion of the graft base, by evaporating the water. 0.2 g of this film was mixed with 50 g of toluene, and after 24 hours the toluene was removed with suction from the swollen specimen, and the specimen was weighed. The weighing was repeated after the specimen had been dried for 16 hours in vacuo at 110° C. The following were calculated:

$$\text{Swelling index } QI = \frac{\text{Weight of the swollen specimen after solvent removal with suction}}{\text{Weight of the specimen dried in vacuo}}$$

$$\text{Gel content} = \frac{\text{Weight of the specimen dried in vacuo}}{\text{Initial weight of the specimen before swelling}} \cdot 100\%$$

Particle Sizes of the Rubber Latex

The mean particle size d given is the weight-average particle size, as determined with an analytic ultracentrifuge by the method of W. Scholtan and H. Lange, Kolloid-Z. und Z.-Polymere 250 (1972) pp. 782–796. The ultracentrifuge measurement gives the integral mass distribution of the particle diameter of a specimen. From this it is possible to deduce what percentage by weight of the particles has a diameter which is the same as or less than a particular size.

The $d_{90}$ is that particle diameter for which the diameter of 10% by weight of all particles is smaller and that of 90% by weight is larger. The reverse applies to the $d_{90}$: 90% by weight of all particles have a smaller diameter, and 10% by weight a larger diameter, than $d_{90}$. The weight-average particle diameter $d_{50}$ and the volume-average particle diameter $D_{50}$ are the particle diameters for which the particle diameter of, respectively, 50% by weight and 50% by volume of all particles is larger and that of, respectively, 50% by weight and 50% by volume is smaller. $d_{10}$-, $d_{50}$- and $d_{90}$ describe the breadth Q of the particle size distribution, where $Q=(d_{90}-d_{10})/d_{50}$. The smaller is Q, the narrower is the distribution.

Yellowness Index YI: The Yellowness-Index YI was determined by determining the color coordinates X, Y, Z according to DIN 5033 using standard illuminant D 65 and a 10° standard observer, and the following defining equation:

$$YI=(131.48X-116.46Z)/Y$$

Viscosity number VN: determined according to DIN 53726 on a 0.5% strength by weight solution of the polymer in dimethylformamide.

Melt index MVR: determined according to DIN 53735/30 at 220° C. melt temperature and 10 kg load.

To determine the mechanical and gloss values below, the following test specimens were injection molded from the granules: standard small specimens (see DIN 53453), dumbbell specimens, disks of 60 mm diameter and 2 mm thickness and rectangular specimens of 2 mm thickness. In each case, unless otherwise stated, the melt temperature was 250° C. and the mold temperature 60° C.

Gloss: determined according to ISO 2813 on rectangular specimens of 40×60 mm with 45° angle of incidence, using Byk Microgloss measuring apparatus.

$a_K$: the Charpy notched impact strength $a_K$ was determined on standard small specimens by a flexural impact test according to ISO 179-2/1eA (S) at 23° C. and −30° C.

$a_n$: the Charpy impact strength $a_n$ was determined on standard small specimens according to ISO 179-2/1fU at −30° C.

Vicat: the Vicat softening point was determined on small pressed sheets according to ISO 306/B using a load of 50 N and a heating rate of 50 K/h.

$a_D$: the penetration energy $a_D$ was determined according to ISO 6603-2 on disks or rectangular specimens measuring 40×40 mm by the Plastechon test at −30° C. and 23° C., the samples being produced at melt temperatures of 220, 250 and 280° C.

Tensile strength, ultimate tensile strength, elongation at break and modulus of elasticity: these values were determined according to ISO 527 on dumb-bell specimens at 23° C.

Light scattering and absorption: small flat stepped specimens were injection molded from the granules at 240° C. melt temperature and 80° C. mold temperature, the thinner step being of 1 mm thickness and the thicker step of 2 mm thickness. To determine scattering and absorption, measurements were made on the stepped specimens on both white and black backgrounds, using a Hunter Ultrascan VIS spectrophotometer. From these measurements, using the BCS color measurement system, the specific absorption and scattering were calculated for wavelengths in the range from 400 to 700 nm.

6. Results of the Measurements

The results of the measurements are given in Table 4.

TABLE 4

Blends and measurement results. The amounts of components are given in parts by weight

| Example: | 1 | 2 | 3 | 4 | 5 | 6 |
|---|---|---|---|---|---|---|
| Component A | 31 A1 | 32 A2 | 33 A1 | 33 A2 | 33 A3 | 30 A4 |
| Component B | 69 B2 | 68 B1 | 67 B2 | 67 B2 | 67 B2 | 70 B2 |
| Yellowness Index YI | 19.7 | 20.5 | 23.8 | 24.1 | 24.2 | 25.3 |
| Gloss [%] | 74 | 73 | 73 | 73 | 72 | 72 |
| $a_K$ (23° C.) [hJ/m$^2$] | 24 | 21 | 23 | 24 | 25 | 21 |
| $a_K$ (−30° C.) [hJ/m$^2$] | 10 | 9 | 11 | 12 | 12 | 12 |
| $a_n$ (−30° C.) [hJ/m$^2$] | — | — | 180 | 180 | 164 | 155 |
| Vicat [° C.] | 98 | 98 | 99 | 99 | 100 | 101 |
| MVR 220/10[2)] [ml/10 min] | 12 | 11 | 5 | 5 | 5 | 5 |
| $a_D$ (220° C./23° C.)[1)] [Nm] | 7 | 7 | 19 | 21 | 20 | 20 |
| $a_D$ (220° C./−40° C.)[1)] [Nm] | 2 | 1 | 8 | 8 | 6 | 3 |
| $a_D$ (250° C./23° C.)[1)] [Nm] | 14 | 7 | 22 | 22 | 23 | 20 |
| $a_D$ (250° C./−40° C.)[1)] [Nm] | 5 | 3 | 13 | 15 | 16 | 15 |
| $a_D$ (280° C./23° C.)[1)] [Nm] | 18 | 15 | 20 | 21 | 20 | 21 |

TABLE 4-continued

Blends and measurement results. The amounts of components are given in parts by weight

| | | | | | | |
|---|---|---|---|---|---|---|
| a_D (280° C./−40° C.)¹⁾ [Nm] | 8 | 8 | 10 | 7 | 12 | 10 |
| Tensile strength (23° C.) [MPa] | 43 | 44 | 45 | 46 | 46 | 47 |
| Ultimate tensile strength (23° C.) [MPa] | 33 | 35 | 31 | 33 | 34 | 35 |
| Elongation at break (23° C.) [%] | 8 | 8 | 7 | 7 | 7 | 6 |
| Modulus of elasticity (23° C.) [MPa] | 2170 | 2200 | 2140 | 2120 | 2130 | 2170 |
| Scattering | 3.44 | 3.46 | — | — | — | — |
| Absorption [%] | 0.023 | 0.021 | — | — | — | — |

| Example: | 7 | 8 | 9 | 10 | 11 | 12 | 13 | 14 |
|---|---|---|---|---|---|---|---|---|
| Component A | 28.5 A1 | 23.5 A1 | 30 A1 | 43 A1 | 30 A6 | 30 A7 | 28 A1 | 26 A1 |
| Component B | 71.5 B1 | 76.5 B1 | 38 B1 32 B3 | 57 B2 26 B2 | 70 B1 | 70 B1 | 72 B2 | 48 B1 |
| Component F | | | | | | | 5 F1 | |
| Yellowness Index YI | 19.8 | 15.5 | 24.5 | 20.8 | 22.3 | 22.4 | — | — |
| Gloss [%] | — | — | — | — | — | — | — | — |
| $a_K$ (23° C.) [hJ/m²] | 23 | 16 | 26 | 46 | 17 | 8 | 26 | 19 |
| $a_K$ (−30° C.) [hJ/m²] | 10 | 8 | 9 | 29 | 7 | 6 | 9 | 8 |
| $a_n$ (−30° C.) [hJ/m²] | 120 | 90 | 100 | 160 | 140 | 75 | 120 | 114 |
| Vicat [° C.] | 97 | 99 | 101 | 93 | 97 | 95 | — | 98 |
| MVR 220/10²⁾ [ml/10 min] | 19 | 24 | 9 | 4 | 17 | 19 | 10 | 15 |
| $a_D$ (220° C./23° C.)¹⁾ [Nm] | 16 | 2 | 9 | 19 | 21 | 4 | — | — |
| $a_D$ (220° C./−30° C.)¹⁾ [Nm] | 5 | ? | O,5 | 11 | 7 | 2 | — | — |
| $a_D$ (250° C./23° C.)¹⁾ [Nm] | 20 | 7 | 22 | 23 | 16 | 5 | — | 15 |
| $a_D$ (250° C./−30° C.)¹⁾ [Nm] | 7 | 8 | 4 | 18 | 8 | 3 | — | 5 |
| $a_D$ (280° C./23° C.)¹⁾ [Nm] | 25 | 20 | 22 | 23 | 21 | 25 | — | 8 |
| $a_D$ (280° C./−30° C.)¹⁾ [Nm] | 11 | 8 | 8 | 15 | 10 | 9 | — | 4 |
| Tensile strength (23° C.) [MPa] | 47 | 51 | 48 | 39 | 50 | 46 | 47 | 48 |
| Ultimate tensile strength (23° C.) [MPa] | 40 | 40 | 38 | 28 | 39 | 38 | 40 | 38 |
| Elongation at break (23° C.) [%] | 2.4 | 2.6 | 2.9 | 3.0 | 2.9 | 2.8 | 2.6 | 2.7 |
| Modulus of elasticity (23° C.) [MPa] | 2270 | 2460 | 2210 | 1820 | 2340 | 2190 | 2400 | 2350 |
| Scattering | 3.30 | 3.15 | 3.18 | 3.67 | 3.14 | 3.12 | — | — |
| Absorption [%] | 0.023 | 0.023 | 0.033 | 0.029 | 0.026 | 0.026 | — | — |

¹⁾Melt temperature/test temperature
²⁾Melt temperature [° C.]/load [g]
— not determined

What is claimed is:

1. A thermoplastic molding composition comprising, as components A) to F),

A) from 5 to 80% by weight of a graft polymer A) having bimodal particle size distribution made from, based on A),
  a1) from 40 to 90% by weight of an elastomeric particulate graft base a1), obtained by polymerization of, based on a1),
    a11) from 70 to 100% by weight of at least one conjugated diene,
    a12) from 0 to 30% by weight of at least one other monoethylenically unsaturated monomer and
    a13) from 0 to 10% by weight of at least one polyfunctional, crosslinking monomer and
  a2) from 10 to 60% by weight of a graft a2) made from, based on a2),
    a21) from 65 to 95% by weight of at least one vinylaromatic monomer,
    a22) from 5 to 35% by weight of acrylonitrile,
    a23) from 0 to 30% by weight of at least one other monoethylenically unsaturated monomer, and
    a24) from 0 to 10% by weight of at least one polyfunctional, crosslinking monomer and B) from 20 to 95% by weight of a thermoplastic polymer B) having a viscosity number VN (determined according to DIN 53726 at 25° C., 0.5% strength by weight in dimethylformamide) of from 50 to 120 ml/g, made from, based on B),
  b1) from 69 to 81% by weight of at least one vinylaromatic monomer,
  b2) from 19 to 31% by weight of acrylonitrile, and
  b3) from 0 to 30% by weight of at least one other monoethylenically unsaturated monomer and C) from 0 to 50% by weight of a thermoplastic polymer C) having a viscosity number VN of from 50 to 120 ml/g made from, based on C),
  c1) from 69 to 81% by weight of at least one vinylaromatic monomer,
  c2) from 19 to 31% by weight of acrylonitrile and
  c3) from 0 to 30% by weight of at least one other monoethylenically unsaturated monomer, where components B) and C) differ in their viscosity numbers VN by at least 5 units (ml/g), or in their acrylonitrile content by at least 5 units (% by weight), or in both characteristics, viscosity number VN and acrylonitrile content, by at least 5 units and D) from 0 to 70% by weight of a thermoplastic polymer D) made from, based on D),
  d1) from 63 to less than 69% by weight of at least one vinylaromatic monomer,
  d2) from greater than 31 to 37% by weight of acrylonitrile and
  d3) from 0 to 40% by weight of at least one other monoethylenically unsaturated monomer and
E) from 0 to 50% by weight of a thermoplastic polymer E) made from, based on E),
  e1) from 4 to 96% by weight of at least one vinylaromatic monomer,
  e2) from 4 to 96% by weight of at least one monomer selected from the group consisting of methyl methacrylate, maleic anhydride and maleimides and
  e3) from 0 to 50% by weight of acrylonitrile, where the polymer E) is different from the polymers B) and from C) and D) if they are present and
F) from 0 to 50% by weight of additives F), obtained by
  1) preparing the graft polymers A) by emulsion polymerization,
  2) mixing the graft polymer A) with the polymer B) and the other components C), D), E) and/or F) if they are present, in a mixing apparatus, giving an essentially molten polymer mixture, and
  3) rapid cooling of the essentially molten polymer mixture over a period of from 0 to 10 sec.

2. A thermoplastic molding composition as claimed in claim 1, in which the conjugated diene a11) is butadiene.

3. A thermoplastic molding composition as claimed in claim 1, in which the vinylaromatic monomer a21) and b1) and, if components C), D) and/or E) are present, c1), d1) and e1), is styrene or α-methylstyrene or a mixture of styrene and α-methylstyrene.

4. A thermoplastic molding composition as claimed in claim 1, in which the graft a2) consists essentially of, based on a2),
  a21) from 75 to 85% by weight of styrene and/or α-methylstyrene
  a22) from 15 to 25% by weight of acrylonitrile
and the thermoplastic polymer B) consists essentially of, based on B),
  b1) from 71 to 78% by weight of styrene
  b2) from 22 to 29% by weight of acrylonitrile.

5. A thermoplastic molding composition as claimed in claim 1, in which the monoethylenically unsaturated monomer a12) is styrene or n-butyl acrylate or a mixture of these.

6. A thermoplastic molding composition as claimed in claim 5, in which an initial charge comprises some of the styrene in polymerized form as a polystyrene seed latex and another portion of the styrene is incorporated in the form of monomeric styrene by copolymerization.

7. A thermoplastic molding composition as claimed in claim 1, in which the bimodal particle size distribution of the graft polymer A) has two maxima, at particle sizes of from 25 to 200 nm on the one hand and from 150 to 800 nm on the other hand.

8. A thermoplastic molding composition as claimed in claim 1, in which the bimodal particle size distribution of the graft polymer A) is achieved by agglomerating the polymer particles.

9. A thermoplastic molding composition as claimed in claim 1, in which, in step 1), the graft base a1) is prepared in emulsion using at least one molecular weight regulator.

10. A thermoplastic molding composition as claimed in claim 1, in which, in step 1), the graft a2) is prepared in emulsion using at least one molecular weight regulator.

11. A thermoplastic molding composition as claimed in claim 1, in which the graft a2) comprises polyfunctional, crosslinking monomers a24), and is prepared in emulsion using at least one molecular weight regulator.

12. A thermoplastic molding composition as claimed in claim 1, in which the graft a2) is built up in two steps of different monomer make-up.

13. A thermoplastic molding composition as claimed in claim 1, in which process step 1) gives a graft polymer A) which is moist with water and contains up to 60% by weight, based on A), of residual water.

14. A thermoplastic molding composition as claimed in claim 1, in which process step 2) uses an extruder as mixing apparatus, and at least 30% by weight of the residual water in the moist graft polymer a) is pressed out in the extruder as liquid water.

15. A thermoplastic molding composition as claimed in claim 1, in which process step 3) employs the underwater granulation process for rapid cooling, using water or another cooling liquid.

16. A thermoplastic molding composition as claimed in claim 1, in which, in step 3), the essentially molten polymer mixture is discharged under air or under an inert gas, and then is cooled rapidly by coming into contact with water or with another coolant.

17. A thermoplastic molding composition as claimed in claim 1, in which a13) and a24) are each present in an amount from 0.01 to 5% by weight based on a1) and a2), respectively.

18. A process for producing a thermoplastic molding composition comprising
  1) producing by emulsion polymerization a graft polymer A) having bimodal particle size distribution made from, based on A),
    a1) from 40 to 90% by weight of an elastomeric particulate graft base a1), obtained by polymerization of, based on a1),
      a11) from 70 to 100% by weight of at least one conjugated diene,
      a12) from 0 to 30% by weight of at least one other monoethylenically unsaturated monomer and
      a13) from 0 to 10% by weight of at least one polyfunctional, crosslinking monomer and
    a2) from 10 to 60% by weight of a graft a2) made from, based on a2),
      a21) from 65 to 95% by weight of at least one vinylaromatic monomer,
      a22) from 5 to 35% by weight of acrylonitrile,
      a23) from 0 to 30% by weight of at least one other monoethylenically unsaturated monomer, and
      a24) from 0 to 10% by weight of at least one polyfunctional, crosslinking monomer and
  2) mixing graft polymer A) with a thermoplastic polymer B) having a viscosity number VN (determined according to DIN 53726 at 25° C., 0.5% strength by weight in dimethylformamide) of from 50 to 120 ml/g, made from, based on B),
    b1) from 69 to 81% by weight of at least one vinylaromatic monomer,
    b2) from 19 to 31% by weight of acrylonitrile, and
    b3) from 0 to 30% by weight of at least one other monoethylenically unsaturated monomer and, optionally,
  a thermoplastic polymer C) having a viscosity number VN of from 50 to 120 ml/g made from, based on C),
    c1) from 69 to 81% by weight of at least one vinylaromatic monomer, c2) from 19 to 31% by weight of acrylonitrile and c3) from 0 to 30% by weight of at least one other monoethylenically unsaturated monomer, where components B) and C) differ in their viscosity numbers VN by at least 5 units (ml/g), or in their acrylonitrile content by at least 5 units (% by weight), or in both characteristics, viscosity number VN and acrylonitrile content, by at least 5 units and, optionally, a thermoplastic polymer D) made from, based on D), d1) from 63 to less than 69% by weight of at least one vinylaromatic monomer, d2) from greater than 31 to 37% by weight of acrylonitrile and d3) from 0 to 40% by weight of at least one other monoethylenically unsaturated monomer and, optionally, a thermoplastic polymer E) made from, based on E), e1) from 4 to 96% by weight of at least one vinylaromatic monomer, e2) from 4 to 96% by weight of at least one monomer selected from the group consisting of methyl methacrylate, maleic anhydride and maleimides and e3) from 0 to 50% by weight of acrylonitrile, where the polymer E) is different from the polymers B) and from C) and D) if they are present and, optionally, one or more additives F), in a mixing apparatus, giving an essentially molten polymer mixture, and 3) rapidly cooling the essentially molten polymer mixture over a period of from 0 to 10 sec, wherein the resulting mixture contains 5 to 80% by weight A), 20 to 95% by weight B), 0 to 50% by weight C), 0 to 70% by weight D), 0 to 50% by weight E), and 0 to 50% by weight F).

19. A molding produced from a thermoplastic molding composition as claimed in claim 1.

* * * * *